United States Patent
Adamczyk et al.

(12)

(10) Patent No.: US 6,774,840 B1
(45) Date of Patent: Aug. 10, 2004

(54) SYSTEMS AND METHODS FOR PROVIDING LOCATION-BASED ARRIVAL MONITORING AND NOTIFICATION

(75) Inventors: Maria Adamczyk, Alpharetta, GA (US); Hong Thi Nguyen, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/179,340

(22) Filed: Jun. 24, 2002

(51) Int. Cl.[7] ............................. G01S 5/02; H04B 7/185
(52) U.S. Cl. .............................. 342/357.1; 342/357.09; 342/357.07; 342/357.13; 701/213; 455/456.1
(58) Field of Search .................... 342/357.1, 357.09, 342/357.07, 357.13; 701/213; 455/456.1

(56) References Cited

U.S. PATENT DOCUMENTS 5,701,301 A    12/1997  Weisser, Jr. ................. 370/428
6,204,772 B1 *  3/2001  DeMay et al. ............ 340/686.1
6,360,101 B1 *  3/2002  Irvin .......................... 455/456
6,374,176 B1 *  4/2002  Schmier et al. ............. 701/200
6,424,910 B1 *  7/2002  Ohler et al. ................ 701/202

* cited by examiner

Primary Examiner—Theodore M. Blum
(74) Attorney, Agent, or Firm—Woodcock Washburn LLP (57) ABSTRACT

Systems and methods for notifying a user that a specified person is within a specified distance of a specified meeting location are disclosed. A method according to the invention includes receiving a location signal that represents a current location of a specified party, storing identity data that represents an identity of the specified party and location data that represents a specified location, and determining from the location signal and the location data whether the specified party has arrived at the specified location. Such a method can also include transmitting a notification message if the specified party has arrived at the specified location.

16 Claims, 7 Drawing Sheets

SYSTEMS AND METHODS FOR PROVIDING LOCATION-BASED ARRIVAL MONITORING AND NOTIFICATION

CROSS-REFERENCE TO RELATED APPLICATIONS

The subject matter disclosed herein is related to the subject matter disclosed in U.S. patent application Ser. No. 10/179,815, filed on Jun. 24, 2002 and entitled "Systems And Methods For Providing Notification Of A Location Of A Restrained Party." The subject matter disclosed herein is related to the subject matter disclosed in U.S. patent application Ser. No. 10/179,441, filed on Jun. 24, 2002 and entitled "Systems And Methods For Monitoring And Notification Of Meeting Participant Location." The disclosure of each of the above referenced patent applications is hereby incorporated herein by reference.

FIELD OF THE INVENTION

This invention relates to communication and location systems. More particularly, the invention relates to systems and methods for determining whether a specified person has arrived at a specified location and providing notification of such an arrival.

BACKGROUND OF THE INVENTION

There are certain circumstances in which a person would like to know whether another person has arrived at a certain remote location. For example, a mother might want to know whether her child has arrived safely at school; a husband might want to know whether his wife has arrived at the airport and is waiting to be picked up. To be sure, the mother could follow the child all the way to school, if she can, and the husband could simply wait at the airport for his wife's plane to arrive. Alternatively, the child could call the mother as soon as he arrives at school, or the wife could call her husband as soon as she arrives at the airport.

These solutions, however, are inefficient and, sometimes, untenable. For example, the mother might be at work and unable to follow her child all the way to school, and the child might be unable to use a telephone. The husband might want to stay on the golf course for as long a time as possible before leaving to pick up his wife at the airport, and the wife might not want to be waiting in the airport any longer than she has to be. In such circumstances, the mother would nonetheless like to know when her child arrives at school, and the husband would like to know when his wife arrives at the airport.

It would be advantageous, therefore, if systems and methods were available for determining whether a specified person has arrived at a specified location. Such systems and methods would be particularly advantageous if they included a capability for the user to be notified when the specified party arrives at the specified location.

BRIEF SUMMARY OF THE INVENTION

The invention provides a notification service for notifying a user that a specified person is within a specified distance of a specified location. According to the invention, the global positioning system ("GPS") can be used in conjunction with wireless phone technology to enable automatic tracking of a specified person relative to a specified location. The user can provide the system, via a telephone or web-based interface, for example, with an identity of a person to be monitored for arrival at a given location, such as a school or airport, for example. The system notifies the user when the specified person arrives at the specified location.

A system according to the invention can include means for determining whether a specified party is within a specified location, and means for notifying a second party if the specified party is within the specified location. The specified location can be remote relative to a current location of the second party.

A system according to the invention can include a data store that contains identity data that represents an identity of the specified party and location data that represents a specified location. The data store contains data that represents an identity of a contact, such as a user of the system, and data that represents a communication pathway via which the contact can receive the notification message.

Receiving means is provided for receiving a location signal that represents a current location of a specified party. A signal transmitter can be provided in a device that is adapted to be worn by the specified party and to transmit the location signal. The device can also include a global positioning system signal receiver that is adapted to be worn by the specified party and to receive global positioning signals from each of a plurality of global positions system satellites. The location signal can include the global positioning signals, or a longitude and latitude associated with the specified party.

The system includes determination means for determining from the location signal and the location data whether the specified party has arrived at the specified location. The determination means can determine the current location of the specified party from the location signal. Transmission means is provided for transmitting a notification message if the specified party has arrived at the specified location.

The system can also include a user interface via which a user can provide the identity data, the location data, data that represents the identity of the contact, and data that represents the communication pathway via which the contact can receive the notification message.

BRIEF DESCRIPTION OF THE SEVERAL VIEWS OF THE DRAWING

Other features of the invention are further apparent from the following detailed description of the embodiments of the present invention taken in conjunction with the accompanying drawing, of which.

DETAILED DESCRIPTION OF THE INVENTION

Figure 1:
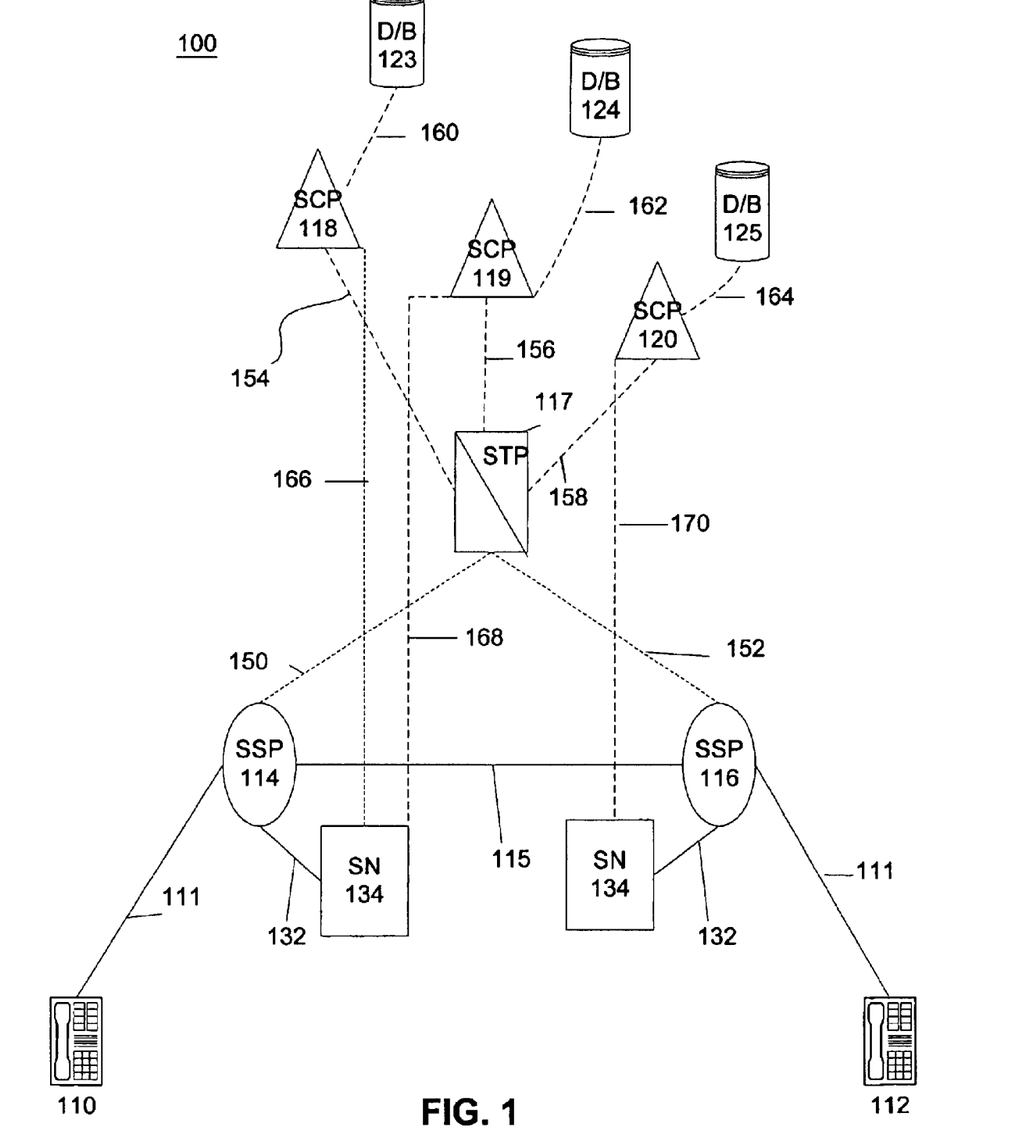
FIG. 1 is a block diagram of an exemplary telecommunication network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled via respective communication paths 160, 162, 164 to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAS) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
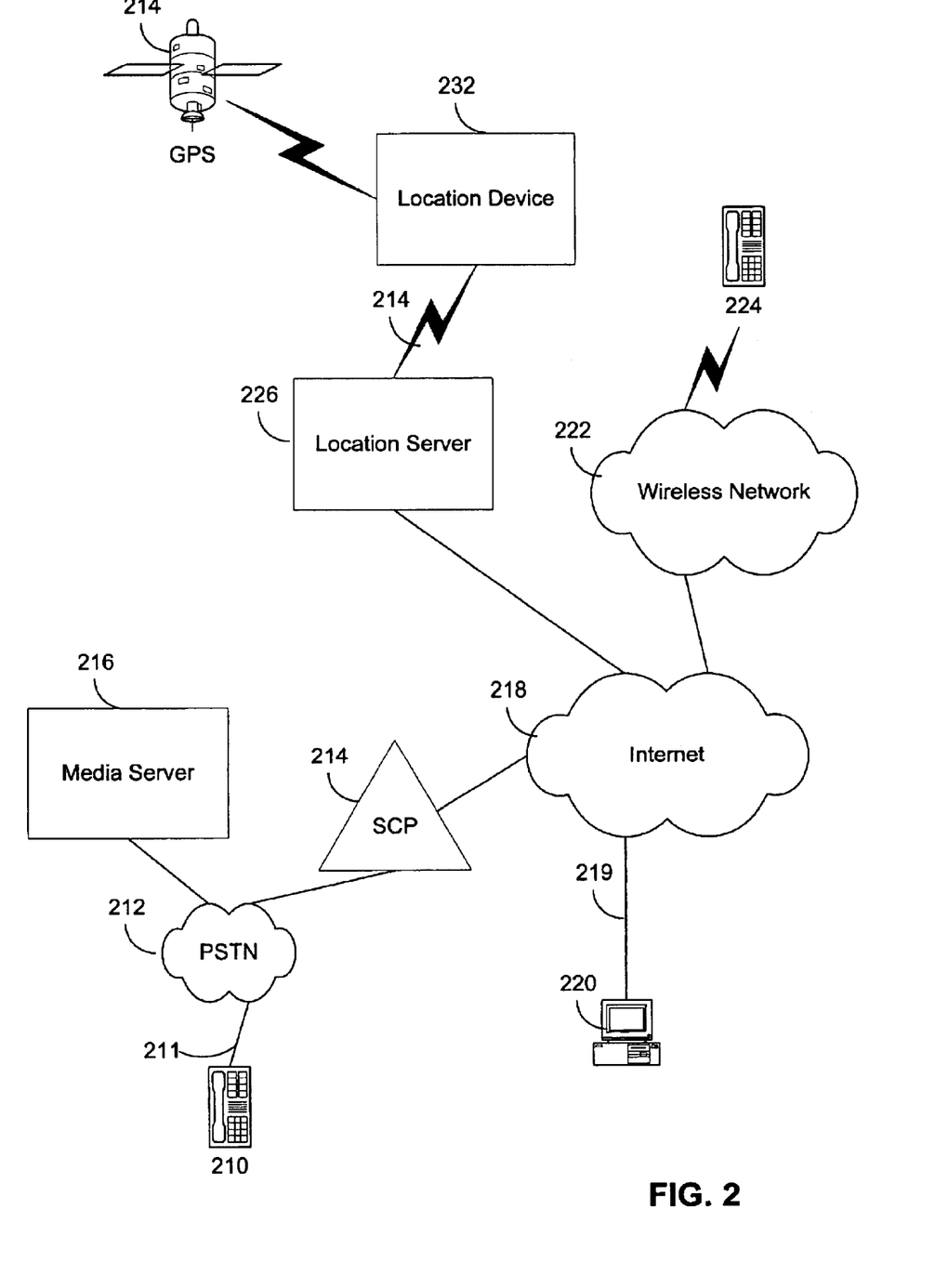
FIG. 2 is a block diagram of a preferred embodiment of a system according to the invention.

FIG. 2 is a block diagram of a preferred embodiment of system according to the invention for providing notification of a specified party's arrival at a specified location. For illustration purposes, as seen in FIG. 2, the present invention can be embodied in a signal control point ("SCP") 214 of an AIN-based telephone system such as described above. The SCP 214 can include a computer-readable medium having computer-executable instructions thereon for performing a method according to the invention. The present invention can be, however, implemented in other components of an AIN-based telephone network, or in any other telephone network or system. Consequently, the present invention should not be construed to be limited to AIN-based systems.

According to the invention, a user can use a telephone 210 to call into the notification service, which can be provided as an option in an existing telephone service or as a standalone service. The user's telephone 210 is connected to a PSTN 212 via a calling line 211. The PSTN 212 directs the call to the SCP 214, which performs the main processing (described below) for the notification service.

Alternatively, the user can connect to the notification service via the Internet 218, or any other local or wide area communications network, such as a proprietary intranet, for example. The user, via a browser executing on the user's client device 220, can access a web site provided by the notification service. The client device 220 can be a desktop or laptop computer, a personal digital assistant, or any other such Internet appliance. The SCP 214 can be coupled to the network 218 via a communication link 219. Thus, a user can access the notification service via a telephone connection or network connection.

A location server 226 can be coupled to the communication network 218 to provide location data to the notification service. The notification service can poll the location server, for example, to retrieve data that represents the current location of the specified party.

In a preferred embodiment of the invention, the specified party can wear or carry a location device 232 that transmits to the location server 226 location signals 214 that represent the current location of the specified party. Preferably, the location device 232 includes a GPS receiver that receives GPS signals from a plurality of GPS satellites, and retransmits the GPS signals to the location server 226. The location server 226 can then compute the current location of the specified party from the GPS signals. Alternatively, the location device 232 can be a simplex device that transmits a signal train (i.e., a series of pulses) to the location server 226. The location server 226 can compute the current location of the specified party from the received signal train. In any event, the location server 226 determines the current location of the specified party, preferably in terms of the longitude and latitude associated the current geographic location of the specified party. The location server 226 can be an integral component of the notification service on the SCP 214, or it can be part of an outside service that provides the location data to the SCP 214.

A media server 216, as is well known in the art, can be coupled to the PSTN 212 to enable the notification service to initiate telephone calls, dispatch electronic mail, or otherwise establish communications with the user or other contacts that the user has set up to receive notifications that the specified party has arrived at the specified location. The notification service can initiate a telephone call, for example, by sending a call request to the media server 216. The media server 216 places the call and plays an audio message informing the contact that the specified party has arrived at the specified location. The message can include the approximate time at which the specified party arrived at the location. The media server can be an integral component of the notification service on the SCP 214, or it can be part of an outside service that performs these functions for the notification service. A wireless network 222 enables the notification service to notify a contact via a wireless device 224, such as a mobile telephone, pager, PDA, or the like.

Figure 3:
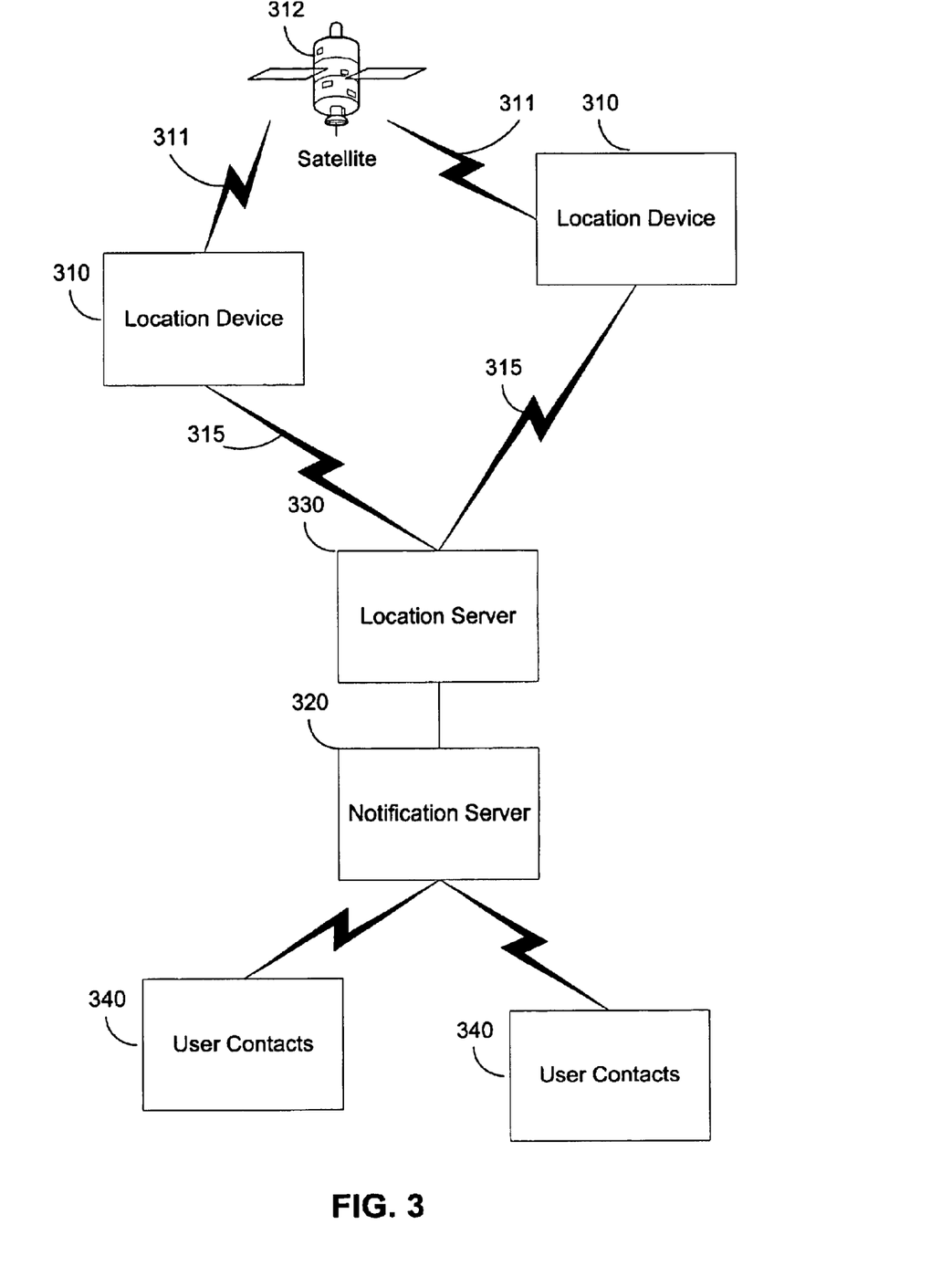
FIG. 3 is a functional block diagram of a preferred embodiment of a system according to the invention.

FIG. 3 is a functional block diagram of a system according to the invention for providing notification of a specified party's arrival at a specified location. Preferably, the specified party wears a location device 310 that includes a GPS receiver that receives global positioning signals 311 from each of a plurality of GPS satellites 312. The receiver computes the current longitude and latitude of the specified party from the global positioning signals 311, and transmits to the location server 330 a specified party location signal 315 that includes the current longitude and latitude of the location of the specified party. Alternatively, the location device 310 could provide the location signals 315 to the location server 330 by merely forwarding the global positioning signals to the location server 330. In this case, the location server 330 could determine the current longitude and latitude of the location of the specified party from the global positioning signals. As shown, any number of location devices 310 can be communicatively coupled to the location server 330. Also, it should be understood that the location server 330 could include a single computer, or any number of computers working in combination.

Periodically, the location server 330 passes to the notification server 320 current location data relating to the specified party. The notification server 320 could periodically "pull" the current location data from the location server 330, or the location server 330 could periodically "push" the location data to the notification server 320.

According to the invention, the notification server 320 maintains a contacts table (see FIG. 5) having an entry associated with each user of the service. As will be described in detail below, the contacts table can contain contact data associated with each of one or more contacts 340 specified by the user. If the notification service determines that the specified party has arrived at the specified location, then the notification service notifies the contacts 340. The contacts 340 can include the user or any other contacts that the user specifies for such notification. As shown, the notification server 320 can provide notification to any number of contacts 340, associated with each of any number of users. Also, it should be understood that the notification server 320 could include a single computer, or any number of computers working in combination.

Figure 4:
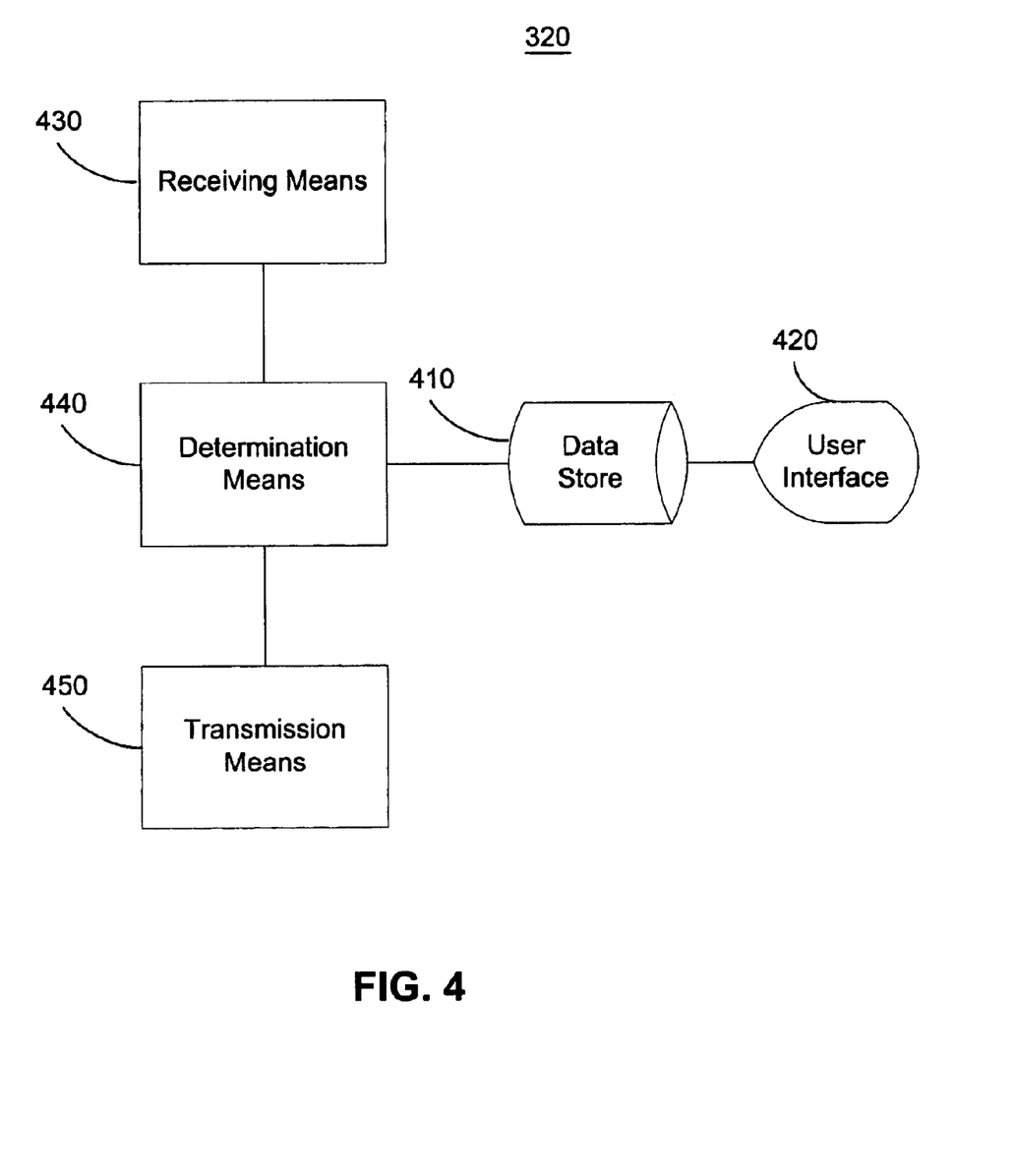
FIG. 4 is a block diagram of a notification server according to the invention.

FIG. 4 is a block diagram of a preferred embodiment of an arrival notification server 320 according to the invention.

As shown, the notification server 320 can include a data store 410 that contains identity data that represents an identity of the specified party, location data that represents a specified location, and distance data that represents a specified distance from the specified location. Preferably, the notification server 320 also includes a user interface 420 via which the user can communicate with the notification server 320 to provide data for storage in the data store 410.

According to the invention, the notification server 320 includes receiving means 430 for receiving location signals that represent the current location of the specified party. The notification server 320 also includes determination means 440 that determines from the location signal and the location data whether the specified party has arrived at the specified location. The notification server 320 includes transmission means 450 for transmitting a notification to each of the user specified contacts if the specified party arrives at the specified location.

Figure 5:
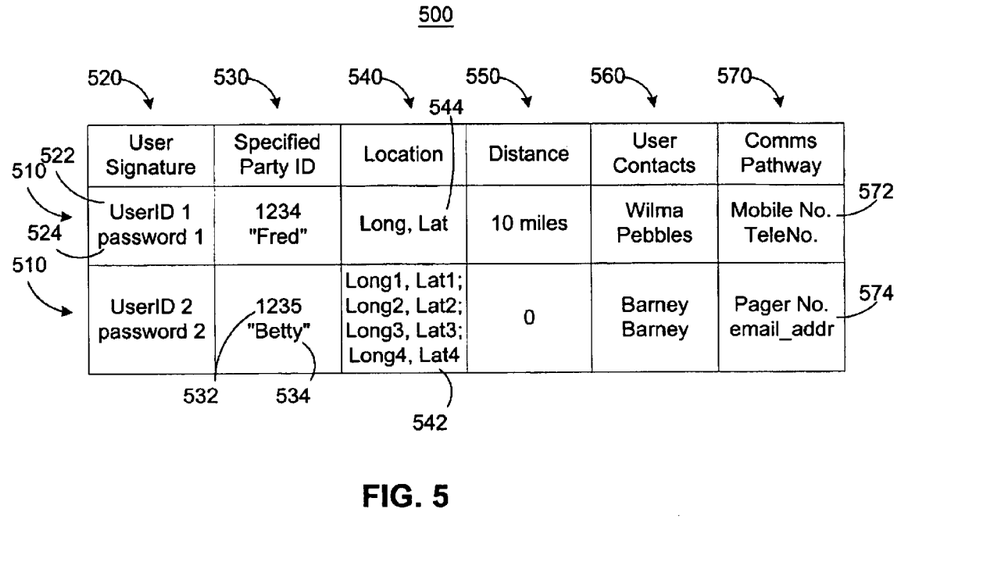
FIG. 5 depicts a preferred embodiment of a contacts table according to the invention.

Preferably, the data in the data store 410 is stored as a contacts table 500, such as depicted in FIG. 5. The contacts table 500 includes a respective entry 510 associated with each user of the notification service. Each such entry can include a user signature 520, which can include, for example, a user D 522 and password 524 associated with the respective user. The contacts table 500 can also include an ID 530 that is associated with the specified party. The specified party ID 530 can include an alphanumeric identifier 532 that is associated with the specified party (such as, an identifier that is associated with the specified party's location device), and a "friendly name" 534 that the user recognizes as being associated with the specified party.

The contacts table 500 can also include one or more locations 540 associated with the specified party. The locations 540 can be locations at which the specified party is expected to arrive, such as school, the playground, home, or any other location at which the user wishes to know when the specified party arrives (e.g., the woods outside town where minors are known to go drinking). The locations are defined in the contacts table 500 by a set 542 of longitudes and latitudes that bound the location. Preferably, the user can input the location data as a street address. The system then converts the user input street address into the set of longitudes and latitudes that correspond to that street address. If the system determines that the specified party is within the bounds that define the specified location 540, then the system provides a notification to each contact 560 that the user has specified in the contacts table 500. Alternatively, the locations can be identified by a single longitude/latitude pair 544.

The contacts table 500 can also include a respective distance 550 associated with each location 540. If the system determines that the specified party is within the specified distance 550 from the corresponding location 540, then the system provides a notification to each contact 560 that the user has specified in the contacts table 500. The distance can be specified from a single longitude/latitude, or from a location bounded by a set of longitudes and latitudes.

The contacts table 500 can also include one or more communications pathways 570 associated with each contact 560. If the system determines that the specified party 530 has arrived at the specified location 540, then the system provides a notification to each contact 560 via the communications pathway(s) 570 specified for that contact 560. A communications pathways 570 can be identified by a telephone number 572, for example, which indicates that a telephone call should be placed to notify the contact, or a network address 574, which indicates that an email message, for example, should be dispatched to the contact.

The data store 410 can also contain notification message data that corresponds to each communications pathway 570 (i.e., whether the communications pathway calls for a text message or an audio message). For example, if the communications pathway is by telephone, then an audio message can be stored in the data store, and played when the phone call is answered. A message such as "This is the notification service. Please be advised that Fred has arrived at school." can be played to a user of the service. A similar text message can also be stored in the data store for use where the communications pathway indicates that an email should be sent, for example, or where the telephone number corresponds to a pager or other Internet appliance that includes an electronic text display.

Figure 6A:
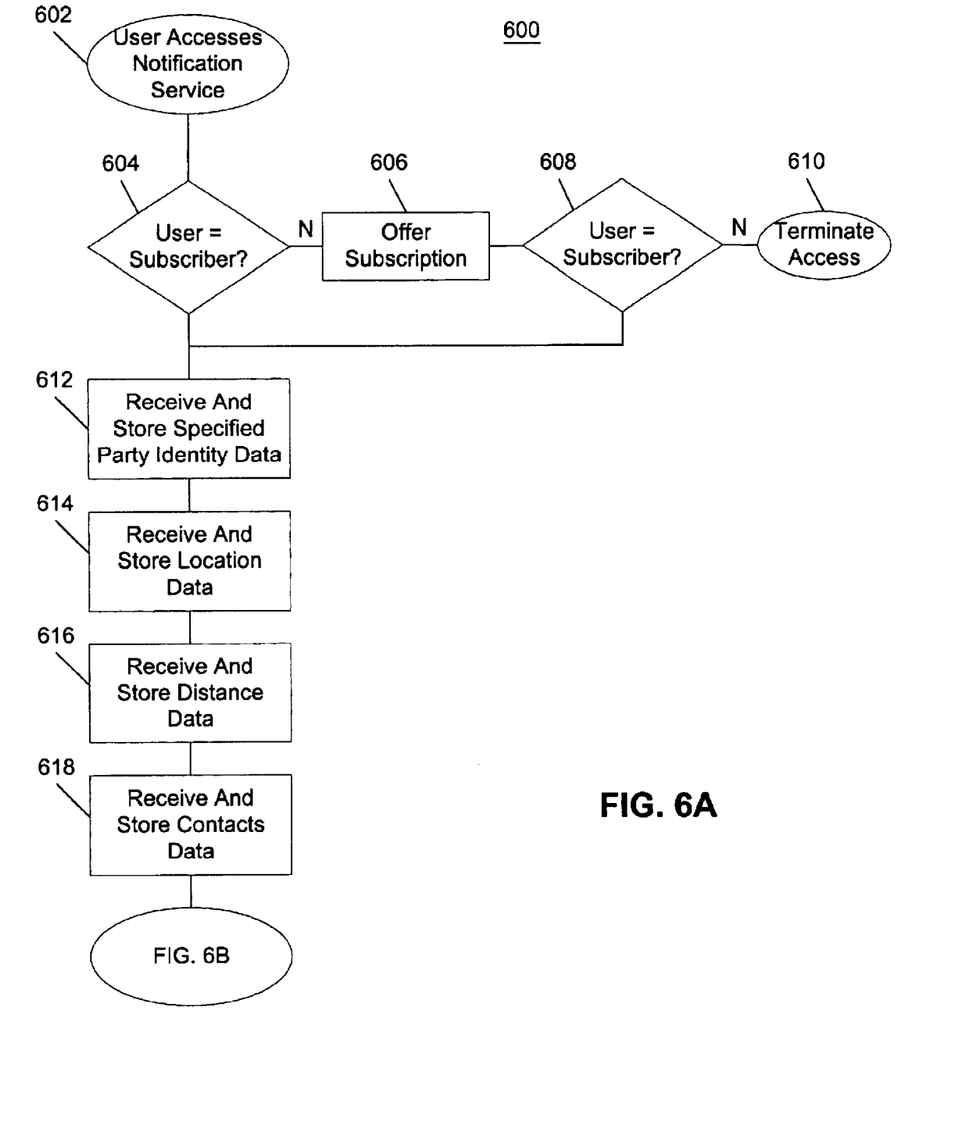
FIGS. 6A and 6B provide a flowchart of a preferred embodiment of a method according to the invention.
Figure 6B:
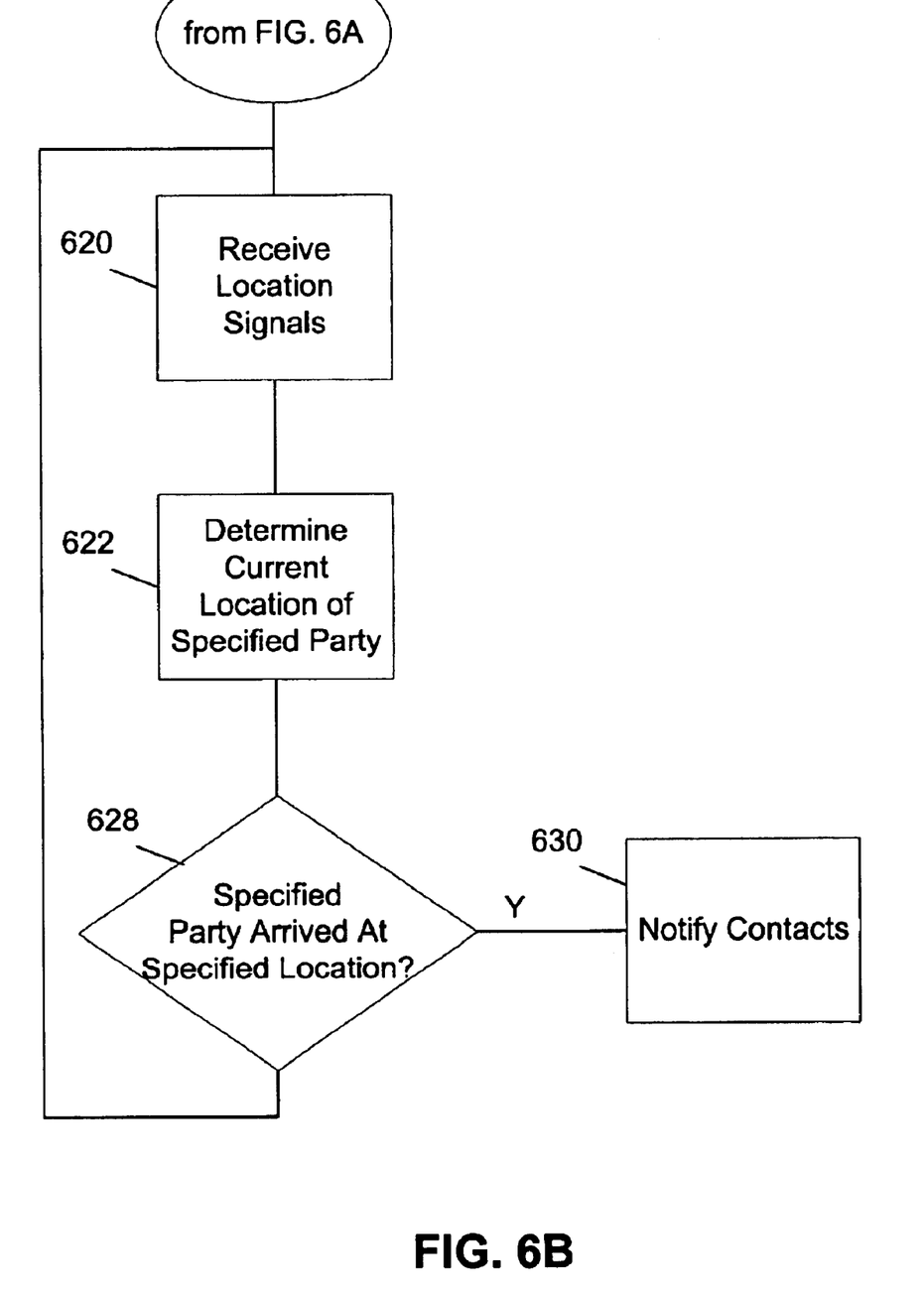

FIGS. 6A and 6B provide a flowchart of a method 600 according to the invention. At step 602, a user accesses the notification service to provide data necessary to set up a user profile in the data store. The user can access the notification service via telephone (e.g., by dialing a telephone number associated with the service), or via the Internet (e.g., by using a browser on the user's computer to connect to a web site that the notification service provides).

In a preferred embodiment of the invention, the service is implemented as a subscription service. That is, only paid subscribers can utilize the service. It should be understood, however, that the service could also be implemented such that a subscription is unnecessary. If the service is implemented as a subscription service, then, at step 604, the service determines whether the user is a subscriber to the service. Otherwise, the service skips to step 612.

Preferably, the service includes a data store that contains a respective account ID and a user signature for each subscriber. A user signature can include, for example, a user ID/password combination associated with the respective subscriber. The account ID can be, for example, a unique alphanumeric identifier that the service assigns to the respective subscriber's account. At step 604, the service invites the user to input a user signature, and determines whether the user is a subscriber by determining whether the input signature is in the data store. Preferably, the service also provides a mechanism by which the user can change his/her signature (e.g., by changing his/her password), and by which the user can provide a friendly name associated with him/herself.

If, at step 604, the notification service determines that the user is not a subscriber (e.g., if the input user signature is not in the data store), then, at step 606, the service provides a user interface via which the user can subscribe to the service. For example, if the service is implemented as a telephone based service, the service can invite the user to subscribe by providing an audio message such as "If you wish to subscribe to this service, please press or say '1.'" The service can then prompt the user to set up an account (e.g., input a signature, friendly name, and preferred payment information) using the telephone keypad or transceiver. Similarly, if the service is implemented as a web-based service, the service can invite the user to subscribe by providing a window (or a link to a subscription web page) that enables the user to set up an account.

At step 608 the service determines whether the user has elected to subscribe. If, at step 608, the service determines that the user has not elected to subscribe (e.g., the user cancels the transaction or does not input the requested data within a certain timeout period), then, at step 610, the service terminates access (by disconnecting the telephone call or providing an error message on the web page, for example).

If the service determines that the user is a subscriber, or if the service is not implemented as a subscription service, then, at step 612, the service begins to request from the user certain data that will enable the service to determine whether a specified party has arrived at a specified location. (If the service is not implemented as a subscription service, then the service can invite a first-time user to set up an account by entering a user signature and friendly name.)

At step 612, the services invites the user to enter an identifier that is associated with the specified party. The user can input a specified party ID, and the specified party's familiar name, for example. The specified party ID can include an alphanumeric string that is stored in an entry in the contacts table that is associated with the user. In order for the service to associate the specified party with the received location signals, it is preferred that the specified party ID is associated with the location device that the specified party is wearing. Accordingly, location signals from the location device can include a device ID that corresponds to the specified party ID of the party wearing the device.

At step 614, the service invites the user to input location data associated with one or more locations. The service receives the location data from the user, and stores the location data in the user's entry in the contacts table. Preferably, the user enters a street address that corresponds to the location. The system converts the user entered street address into a set of longitudes and latitudes that define the boundaries of the location, and stores the set of longitudes and latitudes in the contacts table. Alternatively, the location data can be stored as a single longitude/latitude pair.

At step 616, the service optionally invites the user to input respective distance data associated with each of the one or more locations. The distance data represents the distance that the specified party may be from the associated location in order to trigger the service's notifying the contacts associated with the user. The service stores the distance data in the user's entry in the contacts table. Preferably, any suitable units for distance can be used. The use of distance data is particularly preferred in an embodiment wherein the location data is a single longitude/latitude pair.

At step 618, the service invites the user to input contacts data associated with one or more contacts that the user would like to be notified when the specified party arrives at the specified location. Contacts can include the user/subscriber and any number of third parties that the user would like to notify when the specified party arrives at the specified location. For example, if Johnny arrives at school, Mom wants to be notified. If, however, Johnny arrives at the woods outside town, Mom wants to be notified, but she also wants Dad to be notified as well.

For each contact that the user specifies, the user can input a communications pathway to that contact. For example, the user may wish to be notified via his mobile telephone. Accordingly, the user can provide his mobile telephone number and an indication that the notification should include an audio message. Alternatively or additionally, the user can specify an email address, for example, along with an indication that the notification should include a text message. Similarly, the user can set up his account to trigger a telephone call to one or more third parties, a pager, PDA, or any other communications device that can receive a notification that includes a text or audio message.

After the user account is set up, the service begins monitoring, at step 620, by receiving location signals emitted by the specified party's location signal device. At step 622, the service determines the current location of the specified party. In an embodiment wherein the specified party's location device includes a GPS receiver, the device can transmit location signals that include an identifier associated with the specified party (such as an identifier associated with the specified party's location device, for example), and the longitude and latitude associated with the specified party's current location. In such an embodiment, the service can extract the party ID and longitude and latitude data from the specified party location signals. In an embodiment wherein the specified party location device is a simplex transmitter, the service can calculate the longitude and latitude from the signals.

At step 628, for each of the one or more locations specified in the user's entry in the contacts table, the service determines whether the specified party has arrived at the specified location. For example, the service can determine whether the specified party is within the boundaries that the define the location, or whether the specified party is within the specified distance from the specified location. Using the longitude and latitude of the current location of the specified party, and the longitude(s) and latitude(s) associated with the specified location, the service computes the current distance between the specified party and the specified location. If the current distance between the specified party and the specified location is less than the specified distance associated with the specified location (which may be zero), then the service concludes that the specified party has arrived at the specified location.

If, at step 628, the service determines that the specified party has arrived at the specified location, then, at step 630, the service notifies the contacts in the user's entry in the contacts table. Each contact is notified via the communications pathway associated with that contact in the contacts table. For example, if the communications pathway is the user's mobile telephone, the service can automatically place a telephone call to the user's mobile telephone number, and provide an audio message such as "Mom, This is the Notification Service. Johnny has arrived at school." If the communications pathway is an email address, for example, the service can dispatch an email notification that includes a text message such as "On [date], at [time], Johnny arrived in the woods outside of town."

If, at step 628, the service determines that the specified party is not at the specified location, then the service returns to step 620 and continues monitoring.

Thus, there have been described systems and methods for notifying a user that a specified person has arrived at a specified location. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A system for providing arrival notification, the system comprising:

a user interface via which a user can provide an identifier associated with a user-specified party;

receiving means for receiving a location signal that represents a current location of the user-specified party;

a data store that contains location data that represents a specified location, identity data that represents an identity of a user-specified contact, and pathway data that represents a user-specified communication pathway;

determination means for determining from the location signal and the location data whether the specified party has arrived at the specified location; and transmission means for transmitting a notification message to the contact via the communication pathway if the specified party has arrived at the specified location.

2. The system of claim 1, wherein the data store contains identity data that represents a respective identity of each of a plurality of user-specified contacts, and pathway data, associated with each of the plurality of contacts, that represents a respective user-specified communication pathway via which the associated contact can receive the notification message.

3. The system of claim 1, further comprising:

a location signal device that is adapted to be worn or carried by the specified party and to transmit the location signal.

4. The system of claim 3, wherein the location signal device comprises a global positioning system signal receiver that is adapted to receive global positioning signals from each of a plurality of global positions system satellites.

5. The system of claim 4, wherein the location signal includes the global positioning signals.

6. The system of claim 1, wherein the location signal includes a longitude and a latitude associated with a current geographic location of the specified party.

7. The system of claim 1, further comprising:

a user interface via which a user can provide the location data.

8. The system of claim 1, further comprising:

a user interface via which the user can provide at least one of the identity data and the pathway data.

9. The system of claim 1, further comprising:

means for determining the current geographic location of the specified party from the location signal.

10. A method for providing arrival notification, the method comprising:

receiving, via a user interface, an identity of a party, location data corresponding to a geographic location, and an identity of a contact;

receiving a location signal that represents a current location of the party;

determining from the location signal and the location data whether the party has arrived at the geographic location; and notifying the contact that the party has arrived at the geographic location.

11. The method of claim 10, further comprising:

storing identity data that represents an identity of the party and location data that represents the geographic location.

12. The method of claim 10, further comprising:

receiving, via the user interface, data corresponding to a communications pathway associated with the contact.

13. The method of claim 10, further comprising:

storing distance data that represents a distance from the geographic location; and determining from the location signal, the location data, and the distance data whether the party has arrived at the geographic location.

14. A method for providing arrival notification, the method comprising:

receiving a respective location signal that is associated with each of a plurality of location devices, wherein each of the respective location signals represents a respective current location of the associated location device;

determining from the respective location signals whether any of the location devices is currently located at a user-specified location; and providing to a user-specified contact a notification that a party associated with at least one of the location devices has arrived at the specified location.

15. The method of claim 14, further comprising:

providing a respective notification to each of a plurality of user-specified contacts that a party associated with at least one of the location devices has arrived at the user-specified location.

16. A method for providing arrival notification, the method comprising:

providing a user interface via which a user may provide an identity of a third party, a geographic location associated with the third party, and an identity of a contact;

receiving a location signal that represents a current geographic location of the third party;

determining from the location signal whether the third party has arrived at the location; and notifying the contact that the third party has arrived at the location.

* * * * *

UNITED STATES PATENT AND TRADEMARK OFFICE
CERTIFICATE OF CORRECTION

PATENT NO. : 6,774,840 B1
DATED : August 10, 2004
INVENTOR(S) : Maria Adamczyk and Hong Thi Nguyen It is certified that error appears in the above-identified patent and that said Letters Patent is hereby corrected as shown below:

Column 7,
Line 24, please delete "user D 522" and insert -- user ID 522 -- therefor.

Signed and Sealed this

Twenty-fourth Day of May, 2005

JON W. DUDAS
*Director of the United States Patent and Trademark Office*